3,298,931
REMOVAL OF SCALE IN DISTILLATION OF SEA WATER CONTAINING MAGNESIUM SALTS
Leonard S. Herbert, Mount Waverley, Victoria, and Uldis Jekabs Sterns, Cheltenham, Victoria, Australia, assignors to Commonwealth Scientific and Industrial Research Organization, East Melbourne, Victoria, Australia, a body corporate
Filed Jan. 15, 1963, Ser. No. 251,511
Claims priority, application Australia, Jan. 15, 1962, 13,303/62
8 Claims. (Cl. 203—7)

This invention relates to the distillation of sea water and the like.

The distillation of sea water and other water containing dissolved magnesium salts in stills in common use produces scale on the heat transfer surfaces, which increases the resistance to heat flow and so results in reduced production rates and increased operating costs. The effect can be decreased by the continuous use of chemical additives to minimise scale formation and by limiting the temperature of evaporation, but even so the heat transfer surfaces are usually designed to facilitate cleaning rather than to permit good heat transfer. Such corrective or preventative measures result in large equipment with low rates of distillation; for example, the temperature limitation gives rise to low thermal efficiency and limits, for example, the gained output ratio obtained in multi-effect evaporation.

A technique which has recently been evolved for the efficient evaporation of liquids is known as spray evaporation, which comprises introducing droplets of liquid entrained in a gaseous carrier into one end of a heated evaporator tube, the carrier gas and the vapour generated by evaporation then being separated at the other end of the tube from the unevaporated "thick liquor." When the spray evaporation technique is applied to the evaporation of sea water or other water containing dissolved magnesium salts at temperatures around 220° F., a very high rate of heat transfer is obtained for a few minutes, but then the rate of heat transfer falls off very rapidly due to the formation of a gelatinous scale, which is apparently strongly hydrated magnesium hydroxide, on the inside wall of the heated evaporator tube.

The present invention provides a method of loosening the gelatinous scale which forms on the inside wall of an evaporator tube during the spray evaporation of water containing dissolved magnesium salts, this method comprising passing a current of steam through the evaporator tube to dry out and so loosen the scale.

It is convenient for the supply of liquid to be heated evaporator tube to be interrupted at intervals, and for the said current of steam to be passed through the heated evaporator tube during these intervals. If the gaseous carrier used for the entrainment of the liquid droplets is steam, it is only necessary for the supply of water containing dissolved magnesium salts to be cut off at intervals, the steam used as gaseous carrier being allowed to continue to pass through the evaporator tube, whereby the steam then dries and effects loosening of the gelatinous scale on the inside wall of the tube. When the supply of the feed water containing dissolved magnesium salts is re-established, the loosened scale is flushed out of the tube.

It is found in practice that the aforementioned removal of the gelatinous scale does not increase the heat transfer coefficient quite to its original value, so that there is a gradual fall in the heat transfer coefficients over successive cycles of evaporation and scale removal. This gradual fall appears to be due to the slow deposition, beneath the gelatinous scale, of a crystalline scale which is resistant to the steam drying treatment.

According to a further feature of the invention the crystalline scale is dissolved at intervals by introducing a suitable reagent into the evaporator tube, for example a solution of a mineral acid such as hydrochloric acid, an organic acid such as citric acid, a chelating agent such as ethylene diamine tetra-acetic acid, or a sequestering agent such as a tripolyphosphate. The reagent may, if desired, be added for a short period to the water containing dissolved magnesium salts which is being introduced into the evaporator tube, in which case the introduction of the water containing dissolved magnesium salts need not be interrupted for the purpose of introducing the reagent. Alternatively, the introduction of the water containing dissolved magnesium salts may be interrupted during introduction of the reagent, thereby avoiding dilution of the reagent. Preferably, however, the reagent is introduced into the tube for a short period by entrainment in a current of steam, as specified in our copending application No. 13304/62 of even date, for example by entrainment in the steam normally used for entrainment of the water containing dissolved magnesium salts.

After the cleaning treatment, it is found that the surface of the tube wall appears to have been modified in such a way that the formation of further resistant scale or even the gelatinous type of scale is minimised.

It is noteworthy that the removal of the gelatinous type of scale in accordance with the present invention is not due to "thermal shock," which is a method employed in conventional distillation apparatus. The present method appears to involve drying out of the hydrated scale, with consequent shrinkage and loss of adherence to the heat transfer surface.

An additional advantage of the method according to the present invention is that it facilitates the removal of acid-insoluble scales, for example, calcium sulphate. Such scale is not easily amenable to chemical treatment, and has hitherto had to be removed mechanically after dismantling of the evaporator. During spray evaporation, however, such acid-insoluble scales tend to be deposited within the layer of gelatinous scale rather than on the wall of the tube, and the removal of the gelatinous scale by means of the method according to the present invention effects the removal of the acid-insoluble scale also, or at least simplifies the removal of the acid-insoluble scale.

A preferred method according to the invention will now be described with reference to the accompanying drawings, in which.

Figure 1:
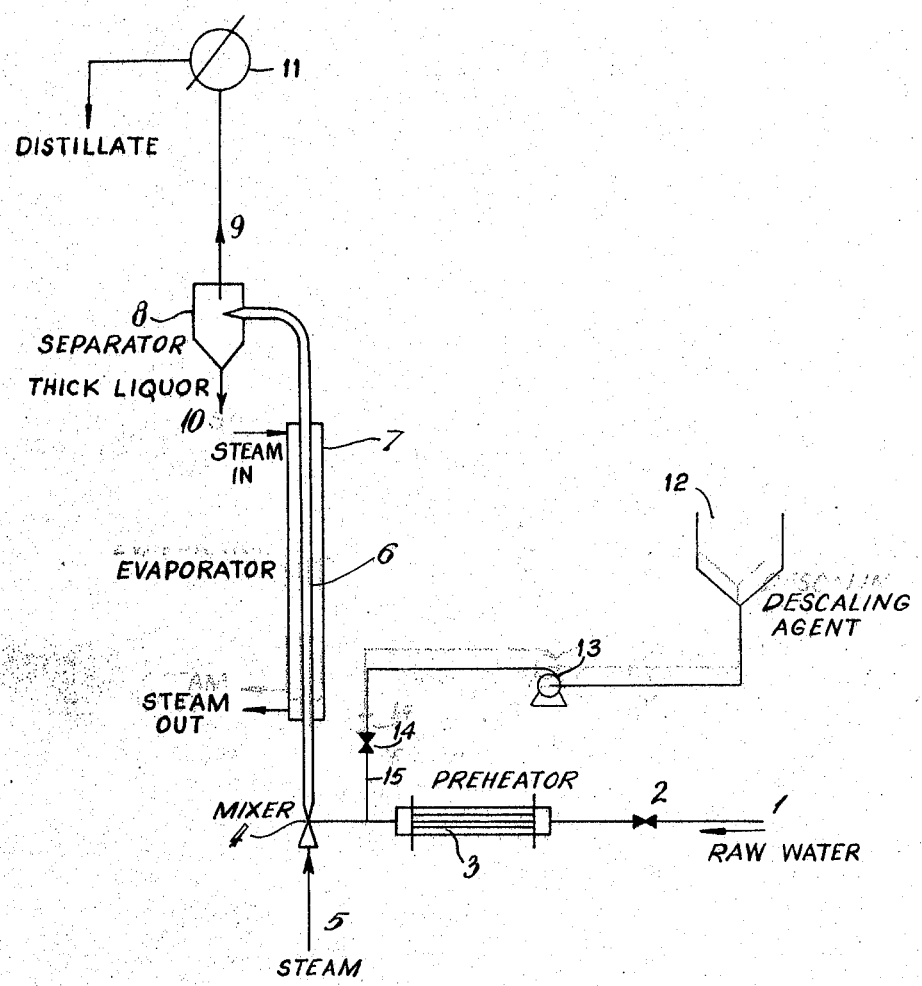
FIGURE 1 is a diagrammatic representation of the apparatus.

In the apparatus of FIGURE 1, sea water or other water containing dissolved magnesium salts is pumped from 1 through an on-off valve 2 to a preheater 3 in which it is preheated to near its boiling point. The hot saline water is then pumped into a steam-water mixer 4 of any suitable type, for example a Venturi throat, in which it is intimately mixed with a small amount of entrainment steam 5. From the mixer 4, the resulting mixture of steam and entrained saline water droplets moves rapidly into an evaporator tube 6 which is of highly conductive metal and is heated on the outside by means of a steam jacket 7. Previous application of a dropwise condensation promoter such as oleic acid or dodecanethiol to that part of the outside of the tube which lies inside the steam jacket is advantageous in giving a high outside condensing film coefficient.

Evaporation occurs in the tube 6, and the resulting mixture of steam and "thick liquor" (saline concentrate) is separated in a cyclone separator 8 or other suitable separator, the steam 9 being condensed in a condenser 11 or heat exchange equipment to form the distillate. The "thick liquor" 10 is run to waste or further evaporated.

As so far described, the process gives a very high rate of heat transfer in the evaporator tube 6 for a period of some minutes. However, the rate of heat transfer falls off very rapidly due to the formation of a gelatinous scale, probably strongly hydrated magnesium hydroxide, on the inner heated wall of the evaporator tube 6. For the removal of this scale, the on-off valve 2 is shut at intervals, for example for a period of 1 or 2 minutes after every ½ to 1 hour of evaporation, thereby stopping the flow of water from 1 to the mixer 4. During these intervals, the entrainment steam 5 and jacket steam are allowed to flow uninterruptedly, so that the scale on the inner wall of the evaporator tube 6 is subjected to a short drying period.

The drying of the scale causes it to shrink and lose its adherence to the inner wall of the tube 6. After the drying period, the on-off valve 2 is opened to permit more saline water 1 to flow to the mixer, this water then flushing the dry scale from the evaporator tube 6 and into the stream of "thick liquor" 10.

An arrangement, such as a supply tank 12, a metering pump 13 and a valve 14, is provided for the periodic introduction of a suitable scale removing agent into the evaporator tube 6, preferably by way of pipe 15 through the mixer 4, as previously described.

Example 1

Figure 2:
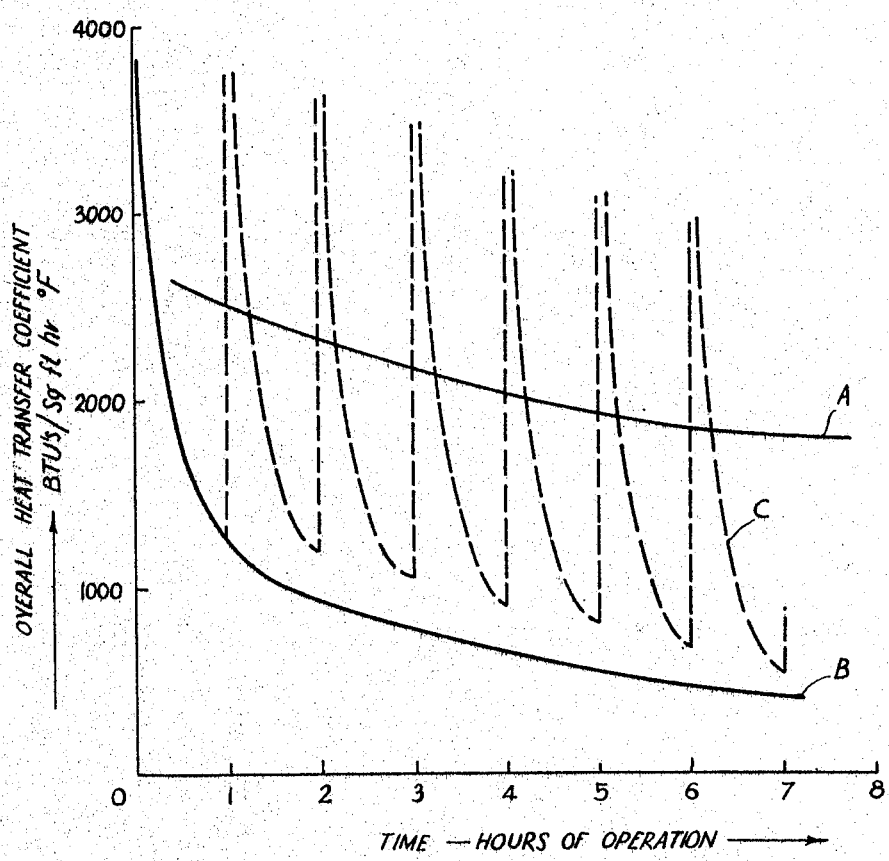
FIGURE 2 is a chart showing the results obtained by the use of the method using the apparatus of FIGURE 1.

In a typical 7-hour run using the process which has just been described to evaporate sea water, with a 1½ minute drying time every 1 hour, the average value of the heat transfer coefficient with a steam jacket pressure of 40 lb. p.s.i.g. fell from a maximum of approximately 2,700 B.t.u. per sq. ft. per hour per ° F. to just under 2,000 B.t.u. per sq. ft. per hour per ° F. This is shown in curve A of FIGURE 2 which represents a plot of the overall heat transfer coefficient against time. This plot was based on values of the heat transfer coefficient taken hourly. The probable instantaneous value of the heat transfer coefficient at any time during such a run is shown by curve C. When the drying period was omitted in a comparative run, as shown in curve B of FIGURE 2, the heat transfer coefficient fell to about 1,100 B.t.u. per sq. ft. per hour per ° F. after only 1 hour of operation and then continued to fall steadily, reaching a value of only about 500 B.t.u. per sq. ft. per hour per ° F. at the end of the 7-hour run.

At this time a cleaning solution of 25 ml. of 12 N HCl in 2½ gallons of sea water was passed through the evaporator tube, this cleaning solution replacing for a short time the normal sea water feed. The heat transfer coefficient rose rapidly during the cleaning period until it had returned to approximately the "clean tube" value (around 4,000 B.t.u. per sq. ft. per hour per ° F.) at the end of the cleaning period. On re-establishing the normal sea water feed, average hourly heat transfer coefficients of 2730 falling to 2290 B.t.u. per sq. ft. per hour per ° F. were measured in the next 3½ hours.

Example 2

As an example of the use of the process in the evaporation of sea water with added $CaSO_4$, excess solid $$CaSO_4 \cdot \tfrac{1}{2} H_2O$$

was added to a tank of sea water and stirred for 24 hours. This liquid was used as feed to a spray evaporator evaporating at 230° F. with a jacket pressure of 40 p.s.i.g. The feed liquid was interrupted for approximately 1½ minutes per hour. The overall heat transfer coefficient average hourly value varied from 2750 in the first hour to 1950 after 7 hours operation. Without scale drying and removal in a previous run, the overall heat transfer coefficient had dropped to 990 after only 2 hours running.

It will thus be apparent that the present invention allows the deleterious effects of scale formation in spray evaporation equipment to be drastically reduced in a simple and economic manner, whereby purified water may be produced from water containing dissolved magnesium salts more economically than hitherto. It will also be apparent that the process of the invention is effective in reducing the deleterious effects of scale which forms as a result of the presence of other salts in addition to magnesium salts.

We claim:

1. A method of forming pure water from raw water containing dissolved magnesium salts with high thermal efficiency which comprises intermittently entraining droplets of said raw water into a constantly moving current of steam to flow said entrained droplets through a tube in a spray type evaporator, heating said tube to evaporate said droplets, removing the resulting evaporant from the resulting heavy liquor, condensing said evaporant to form pure water and maintaining the current of said steam during periods when the droplets of raw water are not being entrained into said current of steam to dry, shrink and loosen the gelatinous scale deposited upon said tube.

2. A method as in claim 1, in which the said water is sea water.

3. Method according to claim 1 including the step of removing the loosened scale from said tube by the subsequent entraining again of the droplets of raw water into said current of steam.

4. Method according to claim 3 wherein there is included the step of maintaining the heating of said tube during the period when the droplets of raw water are not being entrained into said current of steam.

5. Method according to claim 1 including the step of removing crystalline scale deposited upon the tube which comprises periodically mixing a reagent with said raw water so that the entrained droplets for some periods of time are a mixture of said reagent and said raw water, said reagent being selected from the group consisting of mineral acids, organic acids, chelating agents and sequestering agents.

6. Method according to claim 5 wherein said group consists of hydrochloric acid, citric acid, ethylene diamine tetra-acetic acid and tripolyphosphate.

7. Method according to claim 5 including a supply stream for alternately flowing either said raw water or a solution of said reagent to said step for entraining droplets into said current of steam.

8. A method as in claim 5, in which the said water is sea water.

References Cited by the Examiner
UNITED STATES PATENTS

| | | | |
|---|---|---|---|
| 14,230 | 2/1856 | Everett | 134—22 |
| 1,783,478 | 12/1930 | Moore | 132—22 X |
| 2,008,839 | 7/1935 | Samson | 134—22 |
| 2,136,392 | 11/1938 | Murphy | 134—11 X |

(Other references on following page)

UNITED STATES PATENTS

| | | | |
|---|---|---|---|
| 2,177,664 | 9/1939 | Lee | 203—90 X |
| 2,395,260 | 2/1946 | Farmer | 134—22 X |
| 2,471,893 | 5/1949 | Pulley | 203—7 |
| 2,600,820 | 6/1952 | Whatley | 203—7 X |
| 2,671,035 | 3/1954 | Bergman | 134—8 X |
| 2,995,477 | 8/1961 | Florence | 134—22 |
| 3,003,899 | 10/1961 | Eberhard et al. | 134—22 |
| 3,084,076 | 4/1963 | Loucks et al. | 134—22 |
| 3,085,915 | 4/1963 | Heitmann et al. | 134—22 |
| 3,135,670 | 6/1964 | Ristaino | 203—7 |

FOREIGN PATENTS

| | | |
|---|---|---|
| 119,028 | 6/1947 | Sweden. |

NORMAN YUDKOFF, *Primary Examiner.*

MARTIN O. WOLK, *Examiner.*

J. B. DONIHEE, J. ZATARGA, *Assistant Examiners.*